United States Patent [19]

Adachi et al.

[11] Patent Number: 5,081,202

[45] Date of Patent: Jan. 14, 1992

[54] HIGH PURITY PHENYL SILICONE LADDER POLYMER AND METHOD FOR PRODUCING THE SAME

[75] Inventors: Hiroshi Adachi; Etsushi Adachi; Osamu Hayashi; Kazuo Okahashi, all of Amagasaki, Japan

[73] Assignee: Mitsubishi Denki Kabushiki Kaisha, Tokyo, Japan

[21] Appl. No.: 437,826

[22] Filed: Nov. 17, 1989

[51] Int. Cl.$^5$ .............................................. C08G 77/00
[52] U.S. Cl. ...................................... 528/43; 528/12; 556/489
[58] Field of Search ...................... 528/12, 43; 556/489

[56] References Cited

U.S. PATENT DOCUMENTS

| | | | |
|---|---|---|---|
| 3,017,386 | 1/1962 | Brown, Jr. et al. | 260/46.5 |
| 4,399,266 | 8/1983 | Matsumura et al. | 528/43 |
| 4,670,299 | 6/1987 | Fukuyama et al. | 528/12 |

FOREIGN PATENT DOCUMENTS

| | | |
|---|---|---|
| 50-111197 | 9/1975 | Japan . |
| 5718729 | 1/1990 | Japan . |

OTHER PUBLICATIONS

Journal of Polymer Science, vol. 28, pp. 17-34, 1958, M. M. Sprung et al., "The Hydrolysis of N-Amyltriethoxysilane and Phenyltriethoxysilane".

Primary Examiner—Melvyn I. Marquis
Attorney, Agent, or Firm—Oblon, Spivak, McClelland, Maier & Neustadt

[57] ABSTRACT

High purity phenyl silicone ladder polymer, and a method for producing such polymer, suitable for use as the protective film, the interlayer insulating film, etc. in the fabrication of semiconductor elements, which polymer contains therein 1 ppm or below of each of sodium, potassium, iron, copper, lead and chlorine, and 1 ppb or below of each of uranium and thorium, and which is represented by the following general formula (I):

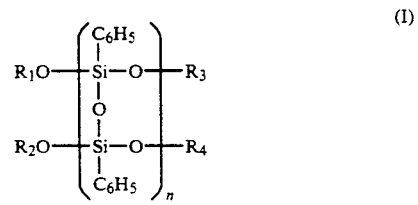

(where: $R_1$ to $R_4$ denote respectively hydrogen or a lower alkyl group; n is an integer of from 8 to 1,000); or the following general formula (II):

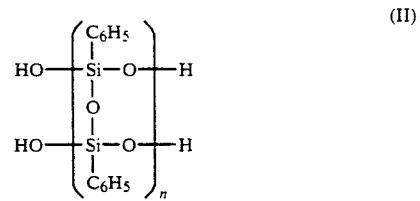

(where: n is an integer of from 8 to 1,600).

11 Claims, No Drawings

HIGH PURITY PHENYL SILICONE LADDER POLYMER AND METHOD FOR PRODUCING THE SAME

BACKGROUND OF THE INVENTION

1. Field of the Invention

This invention relates to high purity phenyl silicone ladder polymer and a method for producing the same. More particularly, it is concerned with high purity phenyl silicone ladder polymer capable of being used as a protective film, an inter-layer insulating film, and so forth of a semiconductor device, etc., and a method for producing such polymer.

2. Discussion of Background

Phenyl silicone ladder polymer has so far been known very well as a heat-resistant polymer. However, there has yet to be established the technique for producing such high purity phenyl silicone ladder polymer with a view of applying it to various electronic device.

According to the conventional processes for producing such phenyl silicone ladder polymer (vide: Japanese Examined Patent Publication No. 15989/1965, Japanese Unexamined Patent Publications No. 111197/1975, No. 111198/1975, No. 111199/1975, and No. 18729/1982), there can be obtained phenyl silicone ladder polymer having the terminal hydroxy group. However, since phenyl trichlorosilane to be used as the starting material has very high reactivity, which might react easily with moisture in air to be decomposed, sufficient care should be taken in its handling. Further, the above-mentioned phenyl silicone ladder polymer is produced by washing a hydrolyzed substance obtained by hydrolysis of phenyl trichlorosilane in an organic solvent to remove a large amount of hydrogen chloride generated during the hydrolytic reaction; then fractionating the organic solvent to recover the hydrolyzed substance (having a weight average molecular weight of about 2,000); and further subjecting the thus recovered hydrolyzed substance to dehydration-condensation at a high temperature in an organic solvent by use of a nucleophilic reagent. The thus produced phenyl silicone ladder polymer, however, contains therein a large amount of impurities. The reason for such high impurity content is that the polymer is produced under such conditions that make it difficult to remove impurities and byproducts, that is: the molecular weight increasing reaction is carried out in a state of the reaction system being closer to a solid phase (vide: Japanese Examined Patent Publication No. 15989/1965, and Japanese Unexamined Patent Publications No. 111197/1975 and No. 111198/1975); or a catalyst such as carbodiimide, etc. is used in a large quantity (vide: Japanese Unexamined Patent Publication No. 18729/1982); or others.

Also, when phenyl triethoxysilane of low reactivity is used (vide: "Journal of Polymer Science", Vol. 28, page 17, 1958), the handling of the material is easy, but it has a problem of being difficult to increase its molecular weight.

After all, phenyl silicone ladder polymer which has been obtained by the conventional method of its production was not developed for its application to the electronic devices.

In view, therefore, of such various points of problem inherent in the conventional methods for producing phenyl silicone ladder polymer, as described in the preceding, the present inventors have engaged in strenuous researches and studies to solve these problems, as the result of which they have discovered that, when superdemineralized water containing therein a small amount of hydrogen chloride is dripped into an organic solvent solution of phenyl alkoxy silane as the starting material to subject it to the hydrolytic reaction, or when superdemineralized water is dripped into an organic solvent solution of phenyl trichlorosilane to subject it to the hydrolytic reaction; then the resulted hydrolyzed substance is washed with super-demineralized water to remove hydrogen chloride as generated; subsequently a small amount of a nucleophilic reagent is added to this solution of hydrolyzed substance to carry out the dehydration-condensation reaction under heat, while agitating the batch, to increase the molecular weight of the substance; and, after termination of the reaction, the reacted solution is dripped into methanol of a grade for use in the electronics industry to recover the reaction product as a precipitate, there can be obtained high purity phenyl silicone ladder polymer capable of being used as the protective film, the inter-layer insulating film, etc. suitable for semiconductor devices. Base on this finding, they completed the present invention.

SUMMARY OF THE INVENTION

It is therefore the primary object of the present invention to provide high purity phenyl silicone ladder polymer suitable for use as the protective film, the inter-layer insulating film, etc. for the semiconductor devices.

According to the present invention, in one aspect of it, there is provided high purity silicone ladder polymer, which contains therein 1 ppm or below of each of sodium, potassium, iron, copper, lead and chlorine, and 1 ppb or below of each of uranium and thorium, and which is represented by the following general formula (I):

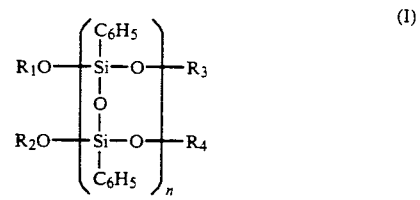

(where: $R_1$ to $R_4$ denote respectively hydrogen or a lower alkyl group; and n is an integer of from 8 to 1,600).

According to the present invention, in another aspect of it, there is provided high purity silicone ladder polymer, which contains therein 1 ppm or below of each of sodium, potassium, iron, copper, lead and chlorine, and 1 ppb or below of each of uranium and thorium, and which is represented by the following general formula (I):

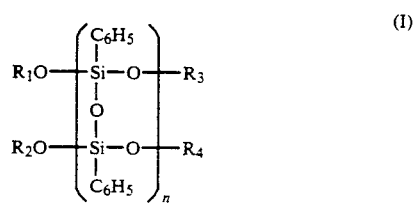

(where: $R_1$ to $R_4$ denote respectively a lower alkyl group; and n is an integer of from 8 to 1,000).

According to the present invention, in still other aspect of it, there is provided high purity phenyl silicone ladder polymer, which contains therein 1 ppm or below of each of sodium, potassium, iron, copper, lead and chlorine, and 1 ppb or below of each of uranium and thorium, and which is represented by the following general formula (II):

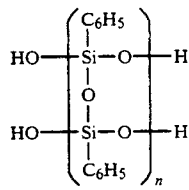

(where: n is an integer of from 8 to 1,600).

According to the present invention, in other aspect of it, there is provided a method for producing high purity silicone ladder polymer, which contains therein 1 ppm or below of each of sodium, potassium, iron, copper, lead and chlorine, and 1 ppb or below of each of uranium and thorium, and which is represented by the following general formula (I):

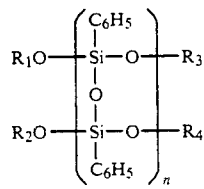

(where: $R_1$ to $R_4$ denote respectively a lower alkyl group; and n is an integer of from 8 to 12), said method being characterized by dissolving phenyl trialoxy silane into an organic solvent; dripping demineralized water containing therein a very small amount of hydrogen chloride into the solvent solution under cooling to thereby hydrolyze phenyl trialoxysilane; and thereafter washing the hydrolyzed substance with use of super-demineralized water.

According to the present invention, in still other aspect of it, there is provided a method for producing high purity phenyl silicone ladder polymer, which contains therein 1 ppm or below of each of sodium, potassium, iron, copper, lead and chlorine, and 1 ppb or below of each of uranium and thorium, and which is represented by the following general formula (I):

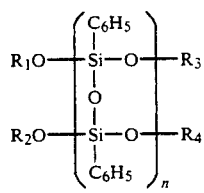

(where: $R_1$ to $R_4$ denote respectively a lower alkyl group; and n is an integer of from 8 to 1,600, preferably from 8 to 1,000, or more preferably from 13 to 1,000), said method being characterized by the steps of: dissolving phenyl trialkoxysilane into an organic solvent; dripping super-demineralized water containing therein a very small amount of hydrogen chloride into the solvent solution of phenyl trialkoxysilane under cooling to thereby hydrolyze the compound; then washing the resulted hydrolyzed substance with super-demineralized water; thereafter subjecting the solution containing therein the hydrolyzed substance to dehydration-condensation reaction by addition thereto of a nucleophilic reagent; and refining the thus obtained high molecular weight substance by the dissolution and reprecipitation method.

According to the present invention, in further aspect of it, there is provided a method for producing high purity phenyl silicone ladder polymer, which contains therein 1 ppm or below of each of sodium, potassium, iron, copper, lead and chlorine, and 1 ppb or below of each of uranium and thorium, and which is represented by the following general formula (II):

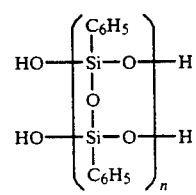

(where: n is an integer of from 8 to 16), said method being characterized by the steps of: dissolving phenyl trichlorosilane into an organic solvent; dripping super-demineralized water into the solvent solution of phenyl trichlorosilane under cooling to hydrolyze the compound; and thereafter washing the resulted hydrolyzed substance with super-demineralized water.

According to the present invention in still further aspect of it, there is provided a method for producing high purity phenyl silicone ladder polymer, which contains therein 1 ppm or below of each of sodium, potassium, iron, copper, lead and chlorine, and 1 ppb or below of each of uranium and thorium, and which is represented by the following general formula (II):

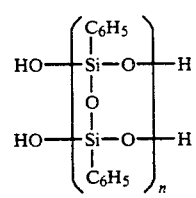

(where: n is an integer of from 8 to 1,600, or more preferably from 17 to 1,600), said method being characterized by the steps of: dissolving phenyl trichlorosilane into an organic solvent; dripping super-demineralized water into the solvent solution of phenyl trichlorosilane under cooling to thereby hydrolyze the compound; then washing the resulted hydrolyzed substance with super-demineralized water; thereafter subjecting the hydrolyzed substance to the dehydration-condensation reaction by addition of a nucleophilic reagent to the organic solvent phase, while heating the same; and finally refining the thus obtained high molecular weight substance by the dissolution-and-reprecipitation method.

The foregoing objects, other objects as well as the ingredients used and the specific reaction conditions to obtain the high purity phenyl silicone ladder polymer according to the present invention will become more apparent and understandable from the following detailed description with reference to several preferred examples thereof.

DETAILED DESCRIPTION OF PREFERRED EMBODIMENTS

According to the production method of the present invention, the high purity phenyl silicone ladder polymer, which contains therein 1 ppm or below of each of sodium, potassium, iron, copper, lead and chlorine, and 1 ppb or below of each of uranium and thorium, and which is represented by the following general formula (I):

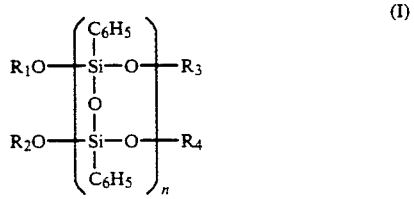

(where: $R_1$ to $R_4$ denote respectively a lower alkyl group; and n is an integer of from 8 to 12) can be obtained by the steps of: dissolving phenyl trialkoxysilane into an organic solvent; dripping super-demineralized water containing therein a very small amount of hydrogen chloride into the solvent solution of phenyl trialkoxy silane under cooling to thereby hydrolyze the compound; and thereafter washing the thus obtained hydrolyzed substance (hereinafter referred to as "prepolymer") with use of super-demineralized water.

In the above general formula (I), $R_1$ to $R_4$ denote respectively a lower alkyl group such as, for example, methyl group, ethyl group, propyl group, and so on.

Also, the high purity phenyl silicone ladder polymer, which contains therein 1 ppm or below of each of sodium, potassium, iron, copper, lead and chlorine, and 1 ppb or below of each of uranium and thorium, and which is represented by the following general formula (II):

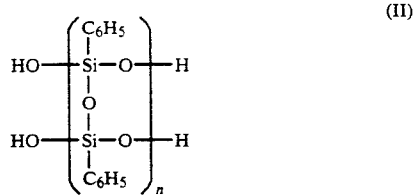

(where: n is an integer of from 8 to 16) can be obtained by the steps of:dissolving phenyl trichlorosilane into an organic solvent; dripping super-demineralized water into the solvent solution of phenyl trichlorosilane under cooling to hydrolyze the compound; and thereafter washing the resulted hydrolyzed substance with super-demineralized water.

The starting material for phenyl silicone ladder polymer according to the present invention should preferably be phenyl trialkoxysilane or phenyl trichlorosilane, which is refined by distillation in a nitrogen current under a reduced pressure.

Examples of phenyl trialkoxysilane are: phenyl triethoxysilane, phenyl trimethoxysilane, phenyl tripropylsilane, and others. These alkoxysilanes possess such properties that they have a low reactivity with water, are difficult to be changed even when they are left in air, and, moreover, are difficult to bring about hydrolysis, poly-condensation, and other reactions. Since the refined phenyl trichlorosilane is readily hydrolyzed by moisture in air to generate hydrogen chloride to be turned into silica, the material should preferably be handled in such a manner that it may not be exposed to moisture-containing air.

The above-mentioned phenyl trialkoxysilane or phenyl trichlorosilane is first dissolved in an organic solvent. While there is no particular limitation to the concentration of phenyl trialkoxysilane or phenyl trichlorosilane in the organic solvent solution, it is preferable that the concentration of the resulting prepolymer in the organic solvent solution be so adjusted as to be usually in a range of from 0.1 to 0.3 g/ml. When the prepolymer concentration is below 0.1 g/ml, the polymerization reaction proceeds at a low rate and the resulting prepolymer is of low molecular weight. As the consequence of this, the above-mentioned washed organic solvent solution after stoppage of the hydrolytic reaction is difficult to be separated into the organic solvent phase and the water phase. On the other hand, when the prepolymer concentration exceeds 0.30 g/ml, there occur various phenomena such that irregular structure is readily introduced into the resulting prepolymer, or the rate of polymerization is partially increased due to heat generated at the time of the hydrolysis not being dissipated effectively, hence the organic solvent solution after the hydrolysis tends to be gelled.

As the above-mentioned organic solvent, there may be used various non-aqueous organic solvents capable of dissolving hydrolyzed substance. Examples of such organic solvents are: ketones such as methyl isobutyl ketone, methyl ethyl ketone, and so forth; ethers such as diethyl ether, isopropyl ether, and so forth; aromatic hydrocarbons such as xylene, toluene, benzene, and so on; and various others. It is preferable that these solvents are of "ELSS" grade (that is, high purity chemicals for use in the electronics industry).

Subsequently, super-demineralized water containing therein a very small amount of hydrogen chloride is dripped into the organic solvent solution, in which phenyl trialkoxysilane is dissolved.

By the term "super-demineralized water" as used herein, it is meant such denimeralized water having a specific resistivity of 16MΩ·cm and above, from which impurities have been removed to the maximum possible extent.

The amount of hydrogen chloride contained in the above-mentioned super-demineralized water is so adjusted that it may be in a range of from 0.02 to 0.23 mol part with respect to 1 mol part of phenyl trialkoxy silane. When the amount of hydrogen chloride is below 0.02 mol part, the effect of hydrogen chloride to function as a catalyst for the dehydration-condensation reaction is small, hence the rate of reaction becomes low. On the other hand, when hydrogen chloride exceeds 0.23 mol part, there can be obtained no effect of its functioning as the catalyst for the portion which corresponds to its quantity as added further, but, on the contrary, such excessive amount tends to hinder the progress in the dehydration-condensation reaction.

When the above-mentioned organic solvent solution is cooled, its temperature should preferably be adjusted to a range of from 0° to 30° C., or more preferably from 5 to 20° C. When the temperature is below 0° C., the super-demineralized water as dripped becomes frozen and the hydrolysis tends to be hindered from its effective progress. On the contrary, when the temperature exceeds 30° C., hydrogen chloride as added becomes readily dissipated, hence the hydrolysis does not tend to proceed promptly.

Incidentally, after the dripping of super-demineralized water is finished, agitation of the reaction system should preferably be continued for further three hours or so to complete the hydrolytic reaction.

The super-demineralized water is also dripped into the organic solvent solution, in which phenyl trichlorosilane is dissolved. The reason for dripping the super-demineralized water according to the method of the present invention is that, if it is added in lump, the heat of reaction is vigorously generated from the hydrolysis. Therefore, when the super-demineralized water is to be dripped, it is advisable that the organic solvent solution be cooled, while it is being agitated.

Here, by the term "super-demineralized water" as used herein, it is meant such demineralized water having a specific resistivity of 16MΩ·cm and above, from which impurities have been removed to the maximum possible extent, as has already been mentioned in the foregoing.

The amount of super-demineralized water to be dripped should preferably be in a range of from 3 to 30 mol parts with respect to 1 mol part of phenyl trichlorosilane in order for the hydrolysis of phenyl trichlorosilane to be proceeded sufficiently. When the dripping quantity of super-demineralized water is below 3 mol parts, there will possibly remain in the reaction system unreacted phenyl trichlorosilane. On the other hand, when phenyl trichlorosilane exceeds 30 mol parts, there can be obtained no effect of its dripping for the portion which corresponds to its quantity as added further, but such excessive amount tends to hinder the hydrolysis.

When the above-mentioned organic solvent solution is cooled, its temperature should preferably be adjusted to a range of from −10° to 20° C. When the temperature is below −10° C., super-demineralized water as dripped becomes frozen and the hydrolytic reaction tends to be slow in its progress. On the contrary, when the temperature exceeds 20° C., the rate of reaction increases, and, at the same time, vigorous heat of reaction is generated, on account of which the resulting prepolymer tends to readily take an irregular structure.

Incidentally, after the dripping of super-demineralized water is finished, agitation of the reaction system should preferably be continued for further two hours or so to complete the hydrolytic reaction.

After the termination of the reaction, the reaction liquid is separated into the organic solvent phase and the water phase.

In the next place, the water phase in the lower phase of the reaction system is removed by use of, for example, a liquid-separation funnel to thereby recover the organic solvent phase containing therein the prepolymer.

The organic solvent phase as recovered is then washed with super-demineralized water. It should, however, be noted that the present invention is not limited to such washing method, but any known methods may be equally adopted. As one example, there may be a method, wherein the organic solvent phase is mixed with the same amount of super-demineralized water, while agitating or shaking the same, after which the organic solvent phase is taken out. In case such washing method is adopted, it is possible to easily remove sodium ion and potassium ion in the prepolymer as well as chlorine ion added at the time of hydrolysis of phenyl trialkoxysilane, or chlorine ion to be generated in a large quantity when phenyl trichlorosilane is used, by repeating the above-mentioned washing operations for three or more times. The removal of these impurities is considered due to the prepolymer as obtained having a ladder structure, which makes it difficult to take the impurities into its molecules. By the way, since the above-mentioned prepolymer has a small molecular weight, and hence it cannot be recovered by the ordinary precipitation method using an appropriate solvent, it is preferable that the prepolymer be recovered in the form of powder through the process steps of fractionating the solvent and drying the residual substance.

In this way, there can be recovered the high purity phenyl silicone ladder polymer, as represented by the above-indicated general formula (I), which contains therein 1 ppm or below of each of sodium, potassium, iron, copper, lead and chlorine, and 1 ppb or below of each of uranium and thorium, and which has a degree of polymerization (n) of from 8 to 12; or the high purity phenyl silicone ladder polymer, as represented by the above-indicated formula (II), which contains therein 1 ppm or below of each of sodium, potassium, iron, copper, lead and chlorine, and 1 ppb or below of each of uranium and thorium, and which has a degree of polymerization (n) of from 8 to 16.

The high purity phenyl silicone ladder polymer having its degree of polymerization (n) of from 13 to 1,000, as represented by the above-indicated general formula (I), or the high purity phenyl silicone ladder polymer having its degree of polymerization (n) of from 17 to 1,600, as represented by the above-indicated general formula (II) can be obtained by first charging the organic solvent phase containing therein the above-mentioned prepolymer into a quartz glass flask equipped with a stirring rod made of fluorine resin, a reflux condenser, and a Dean-Stark trap, then adding a nucleophilic reagent into the flask and heating the reactant to obtain a high molecular weight substance by the dehydration-condensation reaction, and refining the high molecular weight substance by the dissolution-and-reprecipitation method.

As the above-mentioned nucleophilic reagent, there may be exemplified potassium (K), sodium (Na), cesium (Cs), and so on. Preferred among them are: potassium hydroxide, sodium hydroxide, etc. of the "ELSS" grade. The quantity of the nucleophilic reagent (catalyst) should preferably be in a range of from 0.05 to 5% by weight. When the nucleophilic reagent does not reach 0.05% by weight, the catalytic activity thereof becomes low with the consequent decrease in the rate of reaction of the prepolymer. On the contrary, when the reagent exceeds its quantity of 5% by weight, dissociation of the siloxane-bonding caused by the presence of the nucleophilic reagent becomes preponderant, hence the prepolymer does not tend to increase its molecular weight, and further this nucleophilic reagent remains in the reaction system as the impurity. Incidentally, in the case of producing high purity phenyl silicone ladder polymer of a molecular weight of as high as 350 or above, the quantity of the catalyst should preferably be in a range of from 0.1 to 1% by weight.

Subsequently, the prepolymer is subjected to the hydration-condensation reaction under the refluxing condition in the organic solvent phase, to which the above-mentioned nucleophilic reagent has been added. In this case, the refluxing time should preferably be one hour or longer. When the refluxing time is shorter than one hour, there may take place a situation such that the reaction does not proceed satisfactorily.

In the above-described manner, there can be obtained the high purity phenyl silicone ladder polymer of the above-indicated general formula (I) having its degree of polymerization (n) of from 13 to 1,000, or the high purity phenyl silicone ladder polymer of the above-indicated general formula (II) having its degree of polymerization (n) of from 17 to 1,6000.

The degree of polymerization (n) of the polymer can be adjusted by appropriate selection of the solvent, catalyst, and their quantity of use as well as the time for the condensation reaction.

Incidentally, since the resulted phenyl silicone ladder polymer contains therein a very small amount of the nucleophilic reagent as the impurity, it should be refined by the dissolution-and-reprecipitation method.

The above-mentioned dissolution-and-reprecipitation method is a method for refining a substance, by which a solution prepared by dissolving an impurity-containing solute into a rich solvent is gradually dripped into a poor solvent to cause the solute to reprecipitate.

As the rich solvent for the purpose of the present invention, there may be exemplified ether-type solvents. A representative example of the rich solvent is tetrahydrofuran. By the way, it may be preferred that the rich solvent is distilled in advance, and then subjected to filtration through a filter having a pore diameter of 0.05 μm.

As the poor solvent for the purpose of the present invention, there may be exemplified alcohol-type solvent. A representative example of the poor solvent is methyl alcohol. Incidentally, the poor solvent to be used should desirably be of a high purity of the "ELSS" grade.

The above-mentioned rich solvent is added to the reaction solution containing therein the above-mentioned phenyl silicone ladder polymer in such a quantity that may bring the concentration of the polymer to be in a range of from 2 to 8% weight. When the concentration of the phenyl silicone ladder polymer is below 2% by weight, the polymer becomes difficult to be reprecipitated, hence difficult to be refined. On the contrary, when its concentration exceeds 8% by weight, it tends to be difficult to be refined by reprecipitation because the polymer is in excessively high concentration, which renders the nucleophilic reagent to be readily introduced into the molecules.

Thereafter, the reaction solution containing therein the phenyl silicone ladder polymer, to which the rich solvent has been added, is gradually dripped into the poor solvent. The adding quantity of such poor solvent may be in a range of from 5 to 20 times as large as the volume of the reaction solution. When the volume of the poor solvent is below five times with respect to the reaction solution, the impurity ions become difficult to be removed. On the contrary, when the volume of the poor solvent exceeds 20 times with respect to the reaction solution, the solvent is wasted. By the way, the gradual dripping of the poor solvent is to secure efficient removal of the impurity ions.

The phenyl silicone ladder polymer which has thus been precipitated and recovered by its addition to the poor solvent is further dissolved into the rich solvent in the same manner as mentioned in the preceding, and subsequently it is again dripped into the poor solvent to be recovered as the precipitate. Upon repetition of this refining operations for three to five times, the content of the nucleophilic reagent in the polymer is reduced to 1 ppm or below.

In this way, there can be recovered the high purity silicone ladder polymer, as represented by the above-indicated general formula (I), which contains therein 1 ppm or below of each of sodium, potassium, iron, copper, lead and chlorine, and 1 ppb or below of each of uranium and thorium and which has a degree of polymerization (n) of from 13 to 1,000; or the high purity phenyl silicone ladder polymer, as represented by the above-mentioned formula (II), which contains therein 1 ppm or below of each of sodium, potassium, iron, copper, lead and chlorine, and 1 ppb or below of each of uranium and thorium, and which has a degree of polymerization (n) of from 17 to 1,600.

With a view to enabling those persons skilled in the art to put the present invention into practice, the following preferred examples of high purity phenyl silicone ladder polymer and the method of producing the same will be presented. It should however be noted that the present invention is not limited to these examples alone.

EXAMPLES 1 TO 9

Phenyl triethoxy silane as the starting material was distilled at a temperature ranging from 116° C. to 118° C. in a nitrogen gas current under a reduced pressure of 14 mm Hg. Then, a solution prepared by mixing 240.39 g of distilled phenyl triethoxysilane and a solvent of the "ELSS" grade in a quantity as shown in Table 1 below was charged into a four-necked flask of a 2-litre capacity and equipped with a dripping funnel, a thermometer, and a stirring rod, and the solution was cooled to a temperature (hydrolytic temperature) as shown in Table 1 below. Subsequently, demineralized water in a quantity as shown in Table 1 was gradually dripped in a span of time ranging from one to two hours, under agitation, while it was being kept cooling to maintain such temperature. During this dripping, heat generation was not so vigorous. After termination of the dripping, the agitation was further continued for three hours to thereby complete the hydrolytic reaction. The resultant prepolymer solution was transferred to a liquid-separating funnel and left to stand, whereby the prepolymer solution was separated into two layers (phases). Thereafter, water in the lower layer was removed to recover the organic layer containing therein the prepolymer. This organic layer was then washed with super-demineralized water added to it in the same volume as that of the organic layer, while shaking the same. After repeating this washing operation for five times, the remaining aqueous solution was analyzed by an ion chromatographic analyzer (Model: "IC-500", a product of Yokogawa-Hokushin Electric Machinery Co. Ltd., Japan). It was found that, in each of Examples 1 to 9, the content of the chlorine ion was 5 ppm after the first washing, and 1 ppm or below after the third washing. Concentration of the other ions also decreased with the repeated washing operations to become finally 1 ppm or below.

Subsequently, the weight average molecular weight of the prepolymer obtained in each of Examples 1 to 9 was measured by means of gel-permeation chromatography (Model: "TRI-ROTAR-VI", a product of Nippon Spectroscopy Co. Ltd.). The results are shown in Table 1. The content of the impurities in the prepolymer after the third washing was as shown in Table 1, according to which the content of each of sodium, potassium, iron, copper, lead and chlorine was 1 ppm or below, and the content of each of uranium and thorium, which were the radioactive elements, was 1 ppb or below.

Thereafter, when the structure of the prepolymer obtained in each of Examples 1 to 9 was examined by the infrared spectral method (Model: "FT/1R-111", a product of Nippon Spectroscopy Co. Ltd.), each of these polymers was verified to have its structure to be represented by the following general formula (I), from the fact that the double peak of the siloxane-bonding could be seen in the vicinity of 1,100 cm$^{-1}$ (vide: "Journal of Polymer Science (1963)", Vol. C-1, page 83):

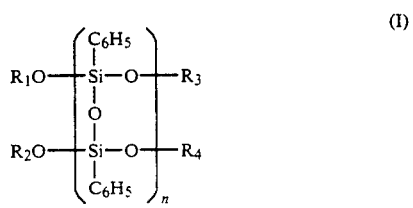

(where: $R_1$ to $R_4$ and n have the same definition as mentioned in the foregoing).

EXAMPLES 10 TO 12

Phenyl trimethoxy silane as the starting material was distilled at a temperature of from 106° C. to 108° C. in the nitrogen current under a reduced pressure of 20 mm Hg. Then, 198.3 g of the thus distilled phenyl trimethoxysilane and a solvent of the "ELSS" grade were mixed in their respective quantities as shown in Table 1, and the mixture was subjected to the hydrolytic reaction in the same manner as in Example 1 to 9 above at a temperature as shown in Table 1 to thereby synthesize the prepolymer, after which it was washed with superdemineralized water. The impurity content was low as shown in Table 1 below.

TABLE 1

| Example | Phenyl alkoxy silane (g) | Solvent (ml) | Super-demineralized water (ml) | Hydrogen chloride/ phenyl triethoxy silane (molar ratio) | Hydrolytic temp. (°C.) | Concentration of the produced prepolymer in organic solvent (g/cc) | Weight average molecular weight of prepolymer |
|---|---|---|---|---|---|---|---|
| 1 | Phenyl triethoxy silane 240.39 | Methyl isobutyl ketone 646 | 160 | 0.10 | 5 | 0.20 | 2000 |
| 2 | Phenyl triethoxy silane 240.39 | Benzene 646 | 160 | 0.10 | 5 | 0.20 | 1800 |
| 3 | Phenyl triethoxy silane 240.39 | Toluene 646 | 160 | 0.10 | 5 | 0.20 | 1700 |
| 4 | Phenyl triethoxy silane 240.39 | Diethyl ether 646 | 160 | 0.10 | 5 | 0.20 | 1500 |
| 5 | Phenyl triethoxy silane 240.39 | Benzene 1290 | 216 | 0.02 | 0 | 0.10 | 1700 |
| 6 | Phenyl triethoxy silane 240.39 | Benzene 430 | 270 | 0.05 | 30 | 0.30 | 1550 |
| 7 | Phenyl triethoxy silane 240.39 | Toluene 1290 | 216 | 0.23 | 0 | 0.10 | 1600 |
| 8 | Phenyl triethoxy silane 240.39 | Toluene 430 | 270 | 0.05 | 10 | 0.30 | 1750 |
| 9 | Phenyl triethoxy silane 240.39 | Methyl isobutyl ketone 1290 | 216 | 0.15 | 20 | 0.10 | 1700 |
| 10 | Phenyl trimethoxy silane 198.3 | Toluene 646 | 160 | 0.1 | 5 | 0.20 | 1850 |
| 11 | Phenyl | Toluene | 160 | 0.2 | 10 | 0.15 | 1700 |

TABLE 1-continued

| | | | | | | | |
|---|---|---|---|---|---|---|---|
| | trimethoxy silane 198.3 | 861 | | | | | |
| 12 | Phenyl trimethoxy silane 198.3 | Toluene 861 | 160 | 0.2 | 15 | 0.15 | 1600 |
| Comparative Example | | | | | | | |
| 1 | Phenyl trimethoxy silane 240.39 | Toluene 323 | 160 | 0.15 | −5 | 0.40 | No hydrolysis proceeds |
| 2 | Phenyl trimethoxy silane 240.39 | Toluene 2580 | 160 | 0.4 | 40 | 0.05 | No hydrolysis proceeds |
| 3 | Phenyl trimethoxy silane 198.3 | Toluene 369 | 160 | 0.15 | −5 | 0.35 | No hydrolysis proceeds |

| | Impurity content in prepolymer | | | | | | |
|---|---|---|---|---|---|---|---|
| | Sodium (ppm) | Potassium (ppm) | Chlorine (ppm) | Iron (ppm) | Copper (ppm) | Lead (ppm) | Uranium (ppb) | Thorium (ppb) |
| Example | | | | | | | | |
| 1 | 0.75 | 0.97 | 0.50 | 0.80 or below | 0.80 or below | 0.80 or below | 1.0 or below | 1.0 or below |
| 2 | 0.73 | 0.95 | 0.45 | 0.80 or below | 0.80 or below | 0.80 or below | 1.0 or below | 1.0 or below |
| 3 | 1.0 | 0.85 | 0.48 | 0.80 or below | 0.80 or below | 0.80 or below | 1.0 or below | 1.0 or below |
| 4 | 0.85 | 0.90 | 0.52 | 0.80 or below | 0.80 or below | 0.80 or below | 1.0 or below | 1.0 or below |
| 5 | 0.81 | 0.99 | 0.43 | 0.80 or below | 0.80 or below | 0.80 or below | 1.0 or below | 1.0 or below |
| 6 | 0.92 | 0.98 | 0.51 | 0.80 or below | 0.80 or below | 0.80 or below | 1.0 or below | 1.0 or below |
| 7 | 0.94 | 0.88 | 0.47 | 0.80 or below | 0.80 or below | 0.80 or below | 1.0 or below | 1.0 or below |
| 8 | 0.75 | 0.87 | 0.48 | 0.80 or below | 0.80 or below | 0.80 or below | 1.0 or below | 1.0 or below |
| 9 | 0.83 | 0.93 | 0.50 | 0.80 or below | 0.80 or below | 0.80 or below | 1.0 or below | 1.0 or below |
| 10 | 0.85 | 0.82 | 0.45 | 0.80 or below | 0.80 or below | 0.80 or below | 1.0 or below | 1.0 or below |
| 11 | 0.80 | 0.85 | 0.50 | 0.80 or below | 0.80 or below | 0.80 or below | 1.0 or below | 1.0 or below |
| 12 | 0.87 | 0.92 | 0.51 | 0.80 or below | 0.80 or below | 0.80 or below | 1.0 or below | 1.0 or below |
| Comparative Example | | | | | | | | |
| 1 | — | — | — | — | — | — | — | — |
| 2 | — | — | — | — | — | — | — | — |
| 3 | — | — | — | — | — | — | — | — |

COMPARATIVE EXAMPLES 1 TO 3

The same procedures were followed as in Examples 1 to 12 above with the exception that the mixing quantities and the hydrolytic temperatures were set as shown in Table 1, thereby hydrolyzing phenyl trialkoxysilane.

When the hydrolytic temperature was −5° C., the demineralized water as dripped became frozen to hinder progress in the hydrolytic reaction, and the resulted polymer had a very small molecular weight. Further, when the hydrolytic temperature was 40° C., there is observed vigorous evaporation of hydrogen chloride which was dripped together with the demineralized water, and the hydrolytic reaction could not proceed, too, in this case. As the consequence of this, the solution could not be refined with the rinsing.

EXAMPLES 13 TO 19

A solution containing therein the high purity prepolymer which had been synthesized with the mixing quantities as shown in Table 2 below, in accordance with the method as described in Examples 1 to 9 above, was charged into a four-necked flask made of quartz glass having a 2-litre capacity and equipped with a stirring rod of Teflon, a Dean-Stark trap, and a thermometer. To this solution, there was added, as the catalyst, a KOH solution prepared by dissolving the compound into methanol of the "ELSS" grade to be in the concentration of 0.1 g/ml, and then dehydration reaction was carried out under the refluxing condition for a period of time as shown in Table 2. The quantity of dehydration during this reaction was approximately 15 ml, which was fractionated in the period of about 1 hour.

The reaction solution which had been heated for a predetermined time was left to cool. Then, purified tetrahydrofuran was added in such a manner that the content of the polymer component might be in the concentration as shown in Table 2, and the mixture was sufficiently agitated to prepare the solution. Thereafter, this reaction solution was dripped into methyl alcohol (ELSS grade) of a quantity ten times as large as that of the reaction solution, and the precipitate of the phenyl silicone ladder polymer having a high molecular weight was recovered. After the precipitated substance was dried, it was rendered tetrahydrofuran solution of a predetermined concentration, same as used in the preceding, and then the solution was dripped again into methyl alcohol to precipitate the phenyl silicone ladder polymer, and recovered the same. This refining operation was repeated for four times.

The molecular weight of the thus synthesized high molecular weight phenyl silicone ladder polymer was measured by means of the gel-permeation chromatography (Model: "TRI-ROTA-VI", a product of Nippon Spectroscopy Co. Ltd.); the concentration of sodium ion, potassium ion, iron ion, copper ion, and lead ion was analyzed by means of an atomic absorption analyzer (Model: "SAS-760", a product of Seiko Denshi Kogyo Co., Ltd., Japan); the chlorine ion concentration was analyzed by means of the ion chromatography (Model: "IC-500", a product of Yokogawa-Hokushin Electric Machinery Co. LTd., Japan); and the content of each of uranium and thorium, which are the radioactive elements, was measured by means of a spectral fluoro-photometer (Model: "MPF-4", a product of Hitachi LTd., Japan). The results are shown in Table 2. As seen from Table 2, high purity phenyl silicone ladder polymer could be obtained. Also, the concentration of the impurity ion decreased with increase in the repeated number of the reprecipitation.

Furthermore, the heat-resistance of the thus obtained phenyl silicone ladder polymer was found by the following methods of measurement, the results of which are shown in Table 2. (Therminal Decomposition Initiating Temperature)

Using a thermo-balance, the thus obtained polymer was heated in air at a rate of temperature elevation of 10° C./min, and changes in weight thereof was examined, from which an initiating temperature of the weight change was measured.

EXAMPLES 20 TO 25

A solution containing therein the high purity prepolymer which had been synthesized with the mixing quantities as shown in Table 2 below, in accordance with the method as described in Examples 10 to 12 above, was charged into a four-necked flask made of quartz glass having a 2-litre capacity and equipped with a stirring rod of fluorine resin, a Dean-Stark trap, and a thermometer. To this solution, there was added, as the catalyst, a KOH solution prepared by dissolving the compound into methanol of the ELSS grade to be in the concentration of 0.1 g/ml, and then dehydration reaction was carried out under the refluxing condition for a period of time as shown in Table 2. The reaction solution which had been heated for a predetermined period of time was left to cool, after which the polymer was refined and recovered in the same manner as in Examples 13 to 19.

COMPARATIVE EXAMPLES 4 TO 6

In accordance with Comparative Examples 1 to 3 above, phenyl trialkoxysilane was hydrolyzed. Since the resulted hydrolyzed substance was found to have a very small molecular weight, it could not be refined by the rinsing. Therefore, the substance was subjected, as it was, to condensation reaction by adding thereto potassium hydroxide, as the catalyst, in a quantity as shown in Table 2, and heating the same for a predetermined period of time. Since the hydrolyzed substance was found to have been slightly polymerized, the polymer was refined by the rinsing. However, the impurity concentration was still high as shown in Table 2.

TABLE 2

| | Phenyl trialkoxy silane (g) | Solvent (ml) | Super-demineralized water (ml) | Demineralized water/phenyl triethoxy silane (molar ratio) | Hydrolytic temperature (°C.) | Concentration of produced prepolymer in solution (g/cc) | Weight average molecular weight of prepolymer | Conditions for dehydration-condensation reaction | | Content of high molecular weight silicone polymer in rich solvent (wt %) |
|---|---|---|---|---|---|---|---|---|---|---|
| | | | | | | | | catalyst (wt %) | Heating time (Hr) | |
| Example | | | | | | | | | | |
| 13 | Phenyl triethoxy silane 240.39 | Benzene 646 | 216 | 12.0 | 5 | 0.20 | 1800 | 0.15 | 4 | 8 |
| 14 | Phenyl triethoxy silane 240.39 | Xylene 646 | 216 | 12.0 | 5 | 0.20 | 1700 | 0.15 | 4 | 8 |
| 15 | Phenyl triethoxy silane 240.39 | Methyl isobutyl ketone 646 | 216 | 12.0 | 5 | 0.20 | 2500 | 0.15 | 4 | 8 |
| 16 | Phenyl triethoxy silane 240.39 | Methyl isobutyl ketone 646 | 190 | 10.6 | 5 | 0.20 | 2300 | 0.25 | 20 | 5 |
| 17 | Phenyl triethoxy silane 240.39 | Methyl isobutyl ketone 646 | 190 | 10.6 | 10 | 0.20 | 3000 | 0.25 | 50 | 5 |
| 18 | Phenyl triethoxy silane 240.39 | Methyl isobutyl ketone 775.2 | 190 | 10.6 | 10 | 0.17 | 2800 | 0.25 | 50 | 5 |

TABLE 2-continued

| | | | | | | | | | | |
|---|---|---|---|---|---|---|---|---|---|---|
| 19 | Phenyl treithoxy silane 240.39 | Methyl isobutyl ketone 1033.6 | 190 | 10.6 | 5 | 0.13 | 2000 | 0.25 | 50 | 5 |
| 20 | Phenyl trimethoxy silane 198.3 | Toluene 646 | 270 | 15 | 10 | 0.20 | 1850 | 0.3 | 50 | 2 |
| 21 | Phenyl trimethoxy silane 198.3 | Toluene 516 | 160 | 8.9 | 5 | 0.25 | 1900 | 0.05 | 50 | 5 |
| 22 | Phenyl trimethoxy silane 198.3 | Toluene 1033.6 | 270 | 15 | 5 | 0.13 | 1500 | 5 | 50 | 2 |
| 23 | Phenyl trimethoxy silane 198.3 | Toluene 646 | 216 | 12.0 | 10 | 0.20 | 1850 | 0.15 | 1 | 5 |
| 24 | Phenyl trimethoxy silane 198.3 | Toluene 646 | 216 | 12.0 | 10 | 0.20 | 1850 | 0.25 | 2 | 5 |
| 25 | Phenyl trimethoxy silane 198.3 | Toluene 646 | 216 | 12.0 | 5 | 0.20 | 1800 | 0.5 | 3 | 5 |
| Comparative Example | | | | | | | | | | |
| 4 | Phenyl triethoxy silane 240.39 | Toluene 323 | 160 | 8.9 | −5 | 0.40 | No hydrolysis proceeds | 0.03 | 50 | 8 |
| 5 | Phenyl triethoxy silane 240.39 | Toluene 2580 | 160 | 8.9 | 40 | 0.05 | No hydrolysis proceeds | 6 | 10 | 8 |
| 6 | Phenyl trimethoxy silane 198.3 | Toluene 369 | 160 | 8.9 | −5 | 0.35 | No hydrolysis proceeds | 5.5 | 30 | 8 |

| | Weight average molecular weight of high purity phenyl silicone ladder polymer | Impurity content in high purity phenyl silicone ladder polymer | | | | | | | | Thermal decomposition |
|---|---|---|---|---|---|---|---|---|---|---|
| | | Sodium (ppm) | Potassium (ppm) | Chlorine (ppm) | Iron (ppm) | Copper (ppm) | Lead (ppm) | Uranium (ppb) | Thorium (ppb) | |
| Example | | | | | | | | | | |
| 13 | 15000 | 0.65 | 0.88 | 0.31 | 0.80 or below | 0.80 or below | 0.80 or below | 1.0 or below | 1.0 or below | 450° C. or above |
| 14 | 12000 | 0.55 | 0.89 | 0.45 | 0.80 or below | 0.80 or below | 0.80 or below | 1.0 or below | 1.0 or below | 450° C. or above |
| 15 | 17000 | 0.66 | 0.85 | 0.35 | 0.80 or below | 0.80 or below | 0.80 or below | 1.0 or below | 1.0 or below | 450° C. or above |
| 16 | 80000 | 0.78 | 0.80 | 0.48 | 0.80 or below | 0.80 or below | 0.80 or below | 1.0 or below | 1.0 or below | 450° C. or above |
| 17 | 185000 | 0.75 | 0.85 | 0.47 | 0.80 or below | 0.80 or below | 0.80 or below | 1.0 or below | 1.0 or below | 450° C. or above |
| 18 | 150000 | 0.65 | 0.75 | 0.35 | 0.80 or below | 0.80 or below | 0.80 or below | 1.0 or below | 1.0 or below | 450° C. or above |
| 19 | 120000 | 0.53 | 0.72 | 0.42 | 0.80 or below | 0.80 or below | 0.80 or below | 1.0 or below | 1.0 or below | 450° C. or above |
| 20 | 110000 | 0.75 | 0.90 | 0.51 | 0.80 or below | 0.80 or below | 0.80 or below | 1.0 or below | 1.0 or below | 450° C. or above |
| 21 | 30000 | 0.65 | 0.87 | 0.57 | 0.80 or below | 0.80 or below | 0.80 or below | 1.0 or below | 1.0 or below | 450° C. or above |
| 22 | 12000 | 0.61 | 0.89 | 0.45 | 0.80 or below | 0.80 or below | 0.80 or below | 1.0 or below | 1.0 or below | 450° C. or above |
| 23 | 4500 | 0.71 | 0.89 | 0.42 | 0.80 or below | 0.80 or below | 0.80 or below | 1.0 or below | 1.0 or below | 400° C. or above |
| 24 | 8000 | 0.64 | 0.90 | 0.43 | 0.80 or below | 0.80 or below | 0.80 or below | 1.0 or below | 1.0 or below | 400° C. or above |
| 25 | 6000 | 0.81 | 0.77 | 0.45 | 0.80 or below | 0.80 or below | 0.80 or below | 1.0 or below | 1.0 or below | 400° C. or above |
| Comparative Example | | | | | | | | | | |
| 4 | 2200 | 0.75 | 1.3 | 1.5 or below | 0.90 or below | 0.90 or below | 0.90 or below | 1.5 or below | 1.5 or below | 400° C. |

TABLE 2-continued

| 5 | 1500 | 0.70 | 2 | 1.5 or below | 0.90 or below | 0.90 or below | 0.90 or below | 1.5 or below | 1.5 or below | 400° C. |
| 6 | 2000 | 0.81 | 1.5 | 1.5 or below | 0.90 or below | 0.90 or below | 0.90 or below | 1.5 or below | 1.5 or below | 400° C. |

EXAMPLES 26 TO 32

Phenyl trichlorosilane as the starting material was distilled at a temperature ranging from 81° C. to 82° C. in a nitrogen gas current under a reduced pressure of 15 mm Hg. Then, a solution prepared by mixing 317.4 g of distilled phenyl trichlorosilane and a solvent of the "ELSS" grade in a quantity as shown in Table 3 below was charged into a four-necked flask having a 2-litre capacity and equipped with a dripping funnel, a thermometer, and a stirring rod, and the solution was cooled to a temperature (hydrolytic temperature) as shown in Table 3 below. Subsequently, demineralized water in a quantity as shown in Table 3 was gradually dripped in a span of time ranging from one to three hours, under agitation, while it was being kept cooling to maintain such temperature. During this dripping, hydrogen chloride was vigorously generated. After termination of the dripping, the agitation was further continued for two hours to thereby complete the hydrolytic reaction. The resultant prepolymer solution was transferred to a liquid-separating funnel and left to stand, whereby the prepolymer solution was separated into two layers (phase). Thereafter, water in the lower layer which contained a large quantity of hydrogen chloride was removed to recover the organic layer containing therein the prepolymer. This organic layer was then washed with super-demineralized water added to it in the same volume as that of the organic layer, while shaking the same. After repeating this washing operation for five times, the quantity of impurities contained in the prepolymer was analyzed by means of an ion chromatographic analyzer (Model: "IC-500", a product of Yokogawa-Hokushin Electric Machinery Co. Ltd., Japan). It was found that the content of the chlorine ion in the prepolymer obtained from each of Examples 26 to 32 was 1,000 ppm after the first washing, and 1 ppm or below after the third washing. Concentration of the potassium ion also decreased with increase in the number of repetition of the washing operations, which became 1 ppm or below after the third washing.

Subsequently, the weight average molecular weight of the prepolymer obtained in each of Example 26 to 32 was measured by means of gel-permeation chromatography (Model: "TRI-ROTAR-V1", a product of Nippon Spectroscopy Co. Ltd.). The results are shown in Table 3. The content of the impurities in the prepolymer after the third washing was as shown in Table 3, according to which the content of each of sodium, potassium, iron, copper, lead and chlorine is 1 ppm or below, and the content of each of uranium and thorium, which were the radioactive elements, was 1 ppb or below.

In the next place, the structure of the prepolymer obtained in each of Examples 26 to 32 was examined by the infrared spectral method (Model: "FT/IR-111", a product of Nippon Spectroscopy Co. Ltd.). Each of these polymers was verified to have its structure to be represented by the following general formula (II), from the fact that the double peak of the siloxane-bonding could be seen in the vicinity of 1,100 cm$^{-1}$ (vide: "Journal of Polymer Science (1963)", Vol. C-1, page 83):

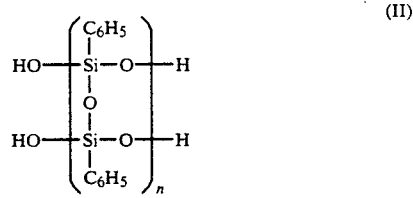

(II)

(where: n is an integer).

Then, the thermal decomposition initiating temperature of the prepolymer obtained in each of the Examples was examined on the basis of the following method. The results are also shown in Table 3 below. (Thermal Decomposition Initiating Temperature)

Using a thermo-balance, the thus obtained polymer was heated in air at a rate of temperature elevation of 10° C./min, and changes in weight thereof was examined, from which an initiating temperature of the weight change was measured.

COMPARATIVE EXAMPLES 7 TO 10

The same procedures were followed as in Examples 26 to 32 above with the exception that the mixing quantities and the hydrolytic temperatures were set as shown in Table 3, thereby hydrolyzing phenyl trichlorosilane. According to Comparative Examples 7 and 8, the rate of reaction was very low, and the resultant prepolymer had a low molecular weight. After stoppage of the reaction, the solution was not separated into phases, and the hydrolyzed substance could not be refined by washing. According to Comparative Examples 9 to 10, the rate of reaction was so high that the reaction liquid became gelled.

COMPARATIVE EXAMPLE 11

105.8 g of refined phenyl trichlorosilane was dissolved into 200 cc of xylene, after which the solution was placed in a dripping funnel. Subsequently, 1 l of super-demineralized water was placed in the dripping funnel, and then the xylene solution of the above-mentioned phenyl trichlorosilane was dripped, under agitation, from the funnel into a four-necked flask which had been cooled to a temperature of 10° C., to thereby carry out hydrolysis. It took four hours until the dripping operation terminated. Then, the reaction liquid was transferred into a liquid-separating funnel to extract the organic layer, which was washed for three times with super-demineralized water until it became neutral. Thereafter, xylene was removed from the reaction liquid and the substance was dried under a reduced pressure.

Subsequently, concentration of the impurities contained in the resulted powder was examined by the atomic absorption analysis. The results are shown in Table 3 below.

TABLE 3

| | Solvent (ml) | Super-Demineralized water (ml) | Super-Demineralized water/phenyl trichloro silane (molar ratio) | Hydrolytic temperature (°C.) | Concentration of produced prepolymer in solution (g/cc) | Weight average molecular weight of prepolymer |
|---|---|---|---|---|---|---|
| Example | | | | | | |
| 26 | Metnyl isobutyl ketone 960 | 200 | 7.4 | 20 | 0.202 | 3900 |
| 27 | Benzene 960 | 160 | 5.9 | 10 | 0.202 | 3700 |
| 28 | Toluene 960 | 400 | 14.8 | 0 | 0.202 | 2500 |
| 29 | Diethyl ether 960 | 240 | 8.6 | −10 | 0.202 | 1900 |
| 30 | Xylene 646 | 81 | 3 | 0 | 0.300 | 2000 |
| 31 | Xylene 780 | 400 | 15 | 0 | 0.248 | 2500 |
| 32 | Xylene 1930 | 810 | 30 | 0 | 0.10 | 3100 |
| Comparative Example | | | | | | |
| 7 | Toluene 3876 | 400 | 14.8 | 30 | 0.05 | 600 |
| 8 | Toluene 3876 | 400 | 14.8 | −20 | 0.05 | 400 |
| 9 | Toluene 554 | 400 | 14.8 | 30 | 0.35 | Gelled |
| 10 | Toluene 554 | 400 | 14.8 | −20 | 0.35 | Gelled |
| 11 | Xylene 200 | 1000 | 111 | 10 | 0.323 | 2000 |

| | Impurity content in prepolymer | | | | | | | | Thermal decomposition initiating temperature (°C.) |
|---|---|---|---|---|---|---|---|---|---|
| | Sodium (ppm) | Potassium (ppm) | Chlorine (ppm) | Iron (ppm) | Copper (ppm) | Lead (ppm) | Uranium (ppb) | Thorium (ppb) | |
| Example | | | | | | | | | |
| 26 | 0.78 | 0.98 | 0.98 | 0.85 or below | 0.85 or below | 0.85 or below | 1.0 or below | 1.0 or below | 400° C. or above |
| 27 | 0.75 | 0.97 | 0.96 | 0.85 or below | 0.85 or below | 0.85 or below | 1.0 or below | 1.0 or below | 400° C. or above |
| 28 | 1.0 | 0.95 | 0.95 | 0.85 or below | 0.85 or below | 0.85 or below | 1.0 or below | 1.0 or below | 400° C. or above |
| 29 | 0.80 | 0.90 | 0.95 | 0.85 or below | 0.85 or below | 0.85 or below | 1.0 or below | 1.0 or below | 400° C. or above |
| 30 | 0.85 | 0.96 | 0.98 | 0.87 or below | 0.85 or below | 0.85 or below | 1.0 or below | 1.0 or below | 400° C. or above |
| 31 | 0.82 | 0.92 | 0.99 | 0.85 or below | 0.85 or below | 0.85 or below | 1.0 or below | 1.0 or below | 400° C. or above |
| 32 | 0.79 | 0.90 | 0.97 | 0.85 or below | 0.85 or below | 0.85 or below | 1.0 or below | 1.0 or below | 400° C. or above |
| Comparative Example | | | | | | | | | |
| 7 | — | — | — | — | — | — | — | — | — |
| 8 | — | — | — | — | — | — | — | — | — |
| 9 | — | — | — | — | — | — | — | — | — |
| 10 | — | — | — | — | — | — | — | — | — |
| 11 | 2.5 | 2.0 | Not reaching 20 | 1.2 | 1.3 | 1.2 | 10 or below | 10 or below | — |

EXAMPLES 33 TO 46

A solution containing therein the high purity prepolymer was prepared in exactly the same manner as in Examples 26 to 32 above, with the exception that various parameters for the kind and quantity of the solvent used, the quantity of super-demineralized water used, the molar ratio between super-demineralized water and phenyl trichlorosilane, the hydrolytic temperature, the concentration of the produced prepolymer in the reaction solution, as indicated in Table 4 below, were used.

Subsequently, the thus prepared solution containing therein the high purity prepolymer was charged into a four-necked flask of a 2-litre capacity, made of quartz glass and equipped with a stirring rod of fluorine resin, Dean-Stark trap, and a thermometer. To this solution in the four-necked flask, there was added, as the catalyst, a KOH solution prepared by dissolving potassium hydroxide into methanol (ELSS grade) to be in concentration of 0.1 g/ml, in a quantity as shown in Table 4 with respect to the prepolymer, and then dehydration reaction was carried out by heating the reaction system under the refluxing condition for a period of time as shown in Table 4. The quantity of dehydration during this reaction was approximately 20 ml, which was fractionated in the period of about 1 hour.

Subsequently, the reaction solution was left to cool, after which refined tetrahydrofuran was added to this solution in a quantity such that the content of the polymer component might be in the concentration as shown in Table 4, and dissolved, while sufficiently agitating the mixture. Thereafter, methyl alcohol ("ELSS" grade) was dripped into this reaction solution in a quantity ten times as large as that of the reaction solution, thereby recovering the precipitate of phenyl silicone ladder polymer having a high molecular weight. After the precipitated substance was dried, tetrahydrofuran the same as that mentioned above, was added to this precipitated substance to render it a tetrahydrofuran solution of the same concentration as mentioned above. Then, this tetrahydrofuran solution was dripped again into methyl alcohol to cause phenyl silicone ladder polymer to precipitate, thereby recovering the same. This refining operation was repeated for four times.

The molecular weight of the thus synthesized high molecular weight phenyl silicone ladder polymer was measured by means of a gel-permeation chromatography (Model: "TRI-ROTA-VI", a product of Nippon Spectroscopy Co. Ltd.); the concentration of sodium ion, potassium ion, iron ion, copper ion, and lead ion was measured by means of an atomic absorption analyzer (Model: "SAS-760", a product of Seiko Denshi Kogyo Co., Ltd., Japan); the concentration of chlorine ion was measured by means of an ion chromatography (Model: "IC-500", a product of Yokogawa-Hokushin Electric Machinery Co. Ltd., Japan); and the content of each of uranium and thorium, which are the radioactive elements, was measured by means of a spectural fluorophotometer (Model: "MPF-4", a product of Hitachi Ltd., Japan). The results are shown in Table 4 below.

In the next place, the structure of the prepolymer obtained in each of Examples 33 to 43 was examined by the infrared spectral method. Each of these polymers was verified to have its structure to be represented by the following general formula (II), from the fact that the double peak of the siloxane-bonding could be seen in the vicinity of 1,100 cm$^{-1}$.

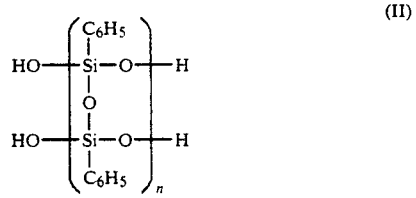

(II)

(where: n is an integer).

As seen from Table 4, there could be obtained high purity phenyl silicone ladder polymer. Also, concentration of the impurity ions decreased with increase in the repeated number of reprecipitation.

Furthermore, the thermal decomposition initiating temperature of the thus obtained phenyl silicone ladder polymer was examined in the same manner as in Example 1 above.

COMPARATIVE EXAMPLES 11 TO 13

Phenyl silicone ladder polymer was obtained in the same manner as in Example 33 above, with the exception that various parameters for the kind and quantity of the solvent used, the quantity of super-demineralized water used, the molar ratio between super-demineralized water and phenyl trichlorosilane, the hydrolytic temperature, the concentration of the produced prepolymer in the reaction solution, the quantity of catalyst used, the heating time, and the content of the polymer in the rich solvent, as indicated in Table 4 below, were used.

In Comparative Example 11, the quantity of the catalyst was excessively large with the consequence that decomposition of the principal chain progressed remarkably, and the molecular weight of the resulted polymer became small. In Comparative Example 12, concentration of the reaction solution was lean at the time of its reprecipitation, on account of which the precipitation liquid became only turbid, and no polymer could be recovered. Further, in Comparative Example 13, since the solution was of high concentration, no satisfactory effect could be attained in its refining, on account of which the catalyst as added in accordance with Table 4 could not be removed sufficiently.

COMPARATIVE EXAMPLE 14

A mixture of 10 g of siloxane polymer having a low molecular weight, as obtained in Comparative Example 10, 10 g of xylene, and 1 ml of a KOH solution, as the catalyst, prepared by dissolving potassium hydroxide into methanol ("ELSS" grade) to be in concentration of 0.1 g/ml was charged into a four-necked flask of quartz glass, equipped with a stirring rod of fluorine type resin, a reflux condenser, and a thermometer, and the mixture was reacted for three hours under the refluxing condition. After termination of the reaction, resulted silicone polymer was recovered in the same manner as in Example 33 above, which was then subjected to refining by repeating the reprecipitation for four times. Then, concentration of the impurities contained in the resulted polymer was examined in the same manner as in Example 33 above. The results are shown in Table 4.

TABLE 4

| | Solvent (ml) | Super-demineralized water (ml) | Super-Demineralized water/phenyl trichloro silane (molar ratio) | Hydrolytic temperature (°C.) | Concentration of produced prepolymer in solution (g/cc) | Weight average molecular weight of prepolymer |
|---|---|---|---|---|---|---|
| Example | | | | | | |
| 33 | Benzene 1500 | 400 | 14.8 | 0 | 0.133 | 2500 |

TABLE 4-continued

| | | | | | | |
|---|---|---|---|---|---|---|
| 34 | Xylene 800 | 400 | 14.8 | 0 | 0.250 | 2500 |
| 35 | Methyl isobutyl ketone 960 | 320 | 11.9 | 0 | 0.208 | 3300 |
| 36 | Methyl isobutyl ketone 960 | 400 | 14.8 | −10 | 0.208 | 3100 |
| 37 | Methyl isobutyl ketone 875 | 480 | 17.8 | 0 | 0.229 | 3400 |
| 38 | Methyl isobutyl ketone 800 | 400 | 14.8 | 5 | 0.250 | 3700 |
| 39 | Methyl isobutyl ketone 1164 | 400 | 14.8 | 10 | 0.172 | 2700 |
| 40 | Toluene 646 | 810 | 30.0 | 0 | 0.310 | 3000 |
| 41 | Toluene 780 | 500 | 18.5 | 0 | 0.256 | 2800 |
| 42 | Toluene 780 | 81 | 3.0 | 5 | 0.256 | 2600 |
| 43 | Toluene 960 | 400 | 14.8 | 10 | 0.208 | 2500 |
| 44 | Toluene 960 | 400 | 14.8 | 0 | 0.208 | 2500 |
| 45 | Toluene 1164 | 400 | 14.8 | 10 | 0.172 | 2000 |
| 46 | Xylene 960 | 400 | 14.8 | 0 | 0.202 | 2500 |
| Comparative Example | | | | | | |
| 11 | Toluene 960 | 400 | 14.8 | 0 | 0.202 | 2500 |
| 12 | Toluene 960 | 400 | 14.8 | 0 | 0.202 | 2500 |
| 13 | Toluene 960 | 400 | 14.8 | 0 | 0.202 | 2500 |
| 14 | Xylene 12 | 1000 | 111 | 10 | 32.3 | 2000 |

| | Dehydration-condensation reaction | | Content of high molecular weight silicone polymer in rich solvent during refining by dissolution and reprecipitation (wt %) | Weight average molecular weight of high purity phenyl silicone ladder polymer |
|---|---|---|---|---|
| | catalyst (wt %) | Heating time (Hr) | | |
| Example | | | | |
| 33 | 0.3 | 4 | 8 | 3500 |
| 34 | 0.25 | 4 | 8 | 4000 |
| 35 | 0.20 | 4 | 8 | 400000 |
| 36 | 0.3 | 50 | 5 | 350000 |
| 37 | 0.29 | 30 | 5 | 161000 |
| 38 | 0.25 | 40 | 5 | 203000 |
| 39 | 0.20 | 40 | 5 | 130000 |
| 40 | 0.50 | 40 | 5 | 100000 |
| 41 | 0.15 | 40 | 5 | 30000 |
| 42 | 5 | 40 | 5 | 10000 |
| 43 | 0.1 | 40 | 5 | 200000 |
| 44 | 0.2 | 20 | 5 | 7000 |
| 45 | 0.1 | 5 | 5 | 5000 |
| 46 | 0.05 | 40 | 5 | 4000 |
| Comparative Example | | | | |
| 11 | 10 | 40 | 5 | 2500 |
| 12 | 0.1 | 40 | 1 | 2500000 |
| 13 | 0.1 | 40 | 10 | 1900000 |
| 14 | 1 | 3 | 8 | 25000 |

| Impurity content in high purity phenyl silicone ladder polymer | | | | | | | | Thermal decomposition initiating |
|---|---|---|---|---|---|---|---|---|
| Sodium | Potassium | Chlorine | Iron | Copper | Lead | Uranium | Thorium | |

TABLE 4-continued

|  | (ppm) | (ppm) | (ppm) | (ppm) | (ppm) | (ppm) | (ppb) | (ppb) | temperature |
|---|---|---|---|---|---|---|---|---|---|
| Example |  |  |  |  |  |  |  |  |  |
| 33 | 0.54 | 0.85 | 0.53 | 0.85 or below | 0.85 or below | 0.85 or below | 1.0 or below | 1.0 or below | 450° C. |
| 34 | 0.50 | 0.90 | 0.92 | 0.85 or below | 0.85 or below | 0.85 or below | 1.0 or below | 1.0 or below | 450° C. |
| 35 | 0.45 | 0.89 | 0.93 | 0.85 or below | 0.85 or below | 0.85 or below | 1.0 or below | 1.0 or below | 450° C. |
| 36 | 0.57 | 0.92 | 0.98 | 0.85 or below | 0.85 or below | 0.85 or below | 1.0 or below | 1.0 or below | 450° C. |
| 37 | 0.56 | 0.95 | 0.76 | 0.85 or below | 0.85 or below | 0.85 or below | 1.0 or below | 1.0 or below | 450° C. |
| 38 | 0.58 | 0.89 | 0.95 | 0.85 or below | 0.85 or below | 0.85 or below | 1.0 or below | 1.0 or below | 450° C. |
| 39 | 0.44 | 0.78 | 0.44 | 0.85 or below | 0.85 or below | 0.85 or below | 1.0 or below | 1.0 or below | 450° C. |
| 40 | 0.75 | 0.80 | 0.97 | 0.85 or below | 0.85 or below | 0.85 or below | 1.0 or below | 1.0 or below | 450° C. |
| 41 | 0.65 | 0.75 | 0.87 | 0.85 or below | 0.85 or below | 0.85 or below | 1.0 or below | 1.0 or below | 450° C. |
| 42 | 0.62 | 0.72 | 0.81 | 0.85 or below | 0.85 or below | 0.85 or below | 1.0 or below | 1.0 or below | 450° C. |
| 43 | 0.53 | 0.74 | 0.88 | 0.85 or below | 0.85 or below | 0.85 or below | 1.0 or below | 1.0 or below | 450° C. |
| 44 | 0.45 | 0.71 | 0.81 | 0.85 or below | 0.85 or below | 0.85 or below | 1.0 or below | 1.0 or below | 450° C. |
| 45 | 0.42 | 0.70 | 0.82 | 0.85 or below | 0.85 or below | 0.85 or below | 1.0 or below | 1.0 or below | 450° C. |
| 46 | 0.65 | 0.85 | 0.77 | 0.85 or below | 0.85 or below | 0.85 or below | 1.0 or below | 1.0 or below | 450° C. |
| Comparative Example |  |  |  |  |  |  |  |  |  |
| 11 | 0.55 | 1.5 | 0.85 | 0.85 or below | 0.85 or below | 0.85 or below | 1.0 or below | 1.0 or below | 450° C. |
| 12 | — | — | — | — | — | — | — | — | — |
| 13 | Not reaching 0.7 | Not reaching 3 | 0.98 | 0.9 or below | 0.9 or below | 0.9 or below | 1.0 or below | 1.0 or below | 450° C. |
| 14 | 2.1 | Not reaching 5 | Not reaching 0.5 | 1.1 | 1.2 | 1.0 or below | 10 or below | 10 or below | 450° C. |

As is apparent from the above Tables 1, 2, 3 and 4, the method of the present invention is capable of reducing, to the minimum possible extent, the impurities such as sodium, potassium, chlorine, iron, copper, lead, uranium, and thorium to be inevitably contained in the high purity phenyl silicone ladder polymer.

As so far described, the method according to the present invention facilitates handling of the starting materials, and makes it possible to readily produce the high purity phenyl silicone ladder polymer. Furthermore, since the high purity phenyl silicone ladder polymer obtained by the method of the present invention possesses its extremely superior heat-resistant property, there acquire various advantages such that it can be used for the passivation film, buffer coating film, interlayer insulating film, and so forth in the fabrication of the semiconductor devices, which contributes definitely to the improved reliability of the semiconductor elements.

What is claimed is:

1. High purity phenyl silicone ladder polymer, which contains therein 1 ppm or below of each of sodium, potassium, iron, copper, lead and chlorine, and 1 ppb or below of each of uranium and thorium, and which is represented by the following formula (I):

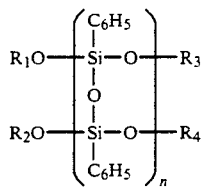

where $R_1$ and $R_4$ denote respectively hydrogen or a lower alkyl group; and n is an integer of from 8 to 1,600.

2. High purity phenyl silicone ladder polymer according to claim 1, wherein $R_1$ to $R_4$ in said formula (I) represent respectively a lower alkyl group, and n is an integer of from 8 to 1,000.

3. High purity phenyl silicone ladder polymer according to claim 1, wherein $R_1$ to $R_4$ in said formula (I) represent respectively a lower alkyl group, and n is an integer of from 13 to 1,000.

4. High purity phenyl silicone ladder polymer according to claim 1, wherein $R_1$ to $R_4$ in said formula (I) represent respectively a lower alkyl group, and n is an integer of from 8 to 12.

5. High purity phenyl silicone ladder polymer according to claim 1, wherein $R_1$ to $R_4$ in said formula (I) represent respectively a lower alkyl group selected from the group consisting of methyl, ethyl and propyl.

6. High purity phenyl silicone ladder polymer according to claim 1, wherein $R_1$ to $R_4$ in said formula (I)

represent respectively hydrogen, and n is an integer of from 8 to 1,600.

7. High purity phenyl silicone ladder polymer according to claim 6, wherein n is an integer of from 8 to 16.

8. A method for producing high purity phenyl silicone ladder polymer, which contains therein 1 ppm or below of sodium, potassium, iron, copper, lead and chlorine, and 1 ppb or below of each of uranium and thorium, and which is represented by the following formula (I):

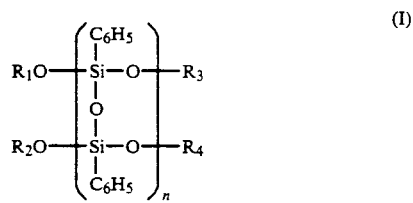

where $R_1$ to $R_4$ are respectively a lower alkyl group; and n is an integer of from 8 to 12, said method being characterized by dissolving phenyl tri(lower)alkoxy silane in an organic solvent; dripping super-demineralized water containing 0.02–0.23 mol hydrogen chloride based on 1 mol phenyl tri(lower)alkoxy silane into said phenyl tri(lower)alkoxy silane, under cooling, thereby hydrolyzing said compound; and thereafter washing said hydrolyzed substance with super-demineralized water.

9. A method for producing high purity phenyl silicone ladder polymer, which contains therein 1 ppm or below of sodium, potassium, iron, copper, lead and chlorine, and 1 ppb or below of each of uranium and thorium, and which is represented by the following formula (I):

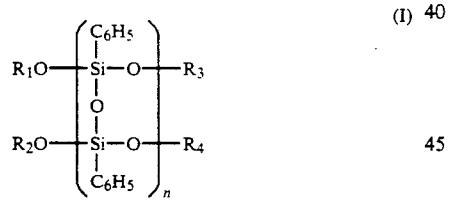

where $R_1$ to $R_4$ are respectively a lower alkyl group; and n is an integer of from 13 to 1,000, said method being characterized by the steps of: dissolving phenyl tri(lower)alkoxy silane in an organic solvent; dripping super-demineralized water containing 0.02–0.23 mol hydrogen chloride based on 1 mol phenyl tri(lower)alkoxy silane into said solvent solution of phenyl tri(lower)alkoxy silane, under cooling, thereby hydrolyzing said compound; then washing the resulting hydrolyzed substance with super-demineralized water; thereafter subjecting said solution containing therein said hydrolyzed substance to dehydration-condensation reaction by addition of a nucleophilic reagent; and finally refining the thus obtained high molecular weight substance by a dissolution-and-reprecipitation method.

10. A method for producing high purity phenyl silicone ladder polymer, which contains therein 1 ppm or below of sodium, potassium, iron, copper, lead and chlorine, and 1 ppb or below of each of uranium and thorium, and which is represented by the following formula (II):

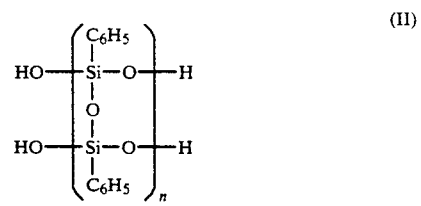

where n is an integer of from 8 to 16, said method being characterized by the steps of: dissolving phenyl trichlorosilane in an organic solvent; dripping super-demineralized water into said solvent solution of phenyl trichlorosilane, under cooling, to hydrolyze said compound; and thereafter washing the resulting hydrolyzed substance with super-demineralized water.

11. A method for producing high purity phenyl silicone ladder polymer, which contains therein 1 ppm or below of sodium, potassium, iron, copper, lead and chlorine, and 1 ppb or below of each of uranium and thorium, and which is represented by the following formula (II):

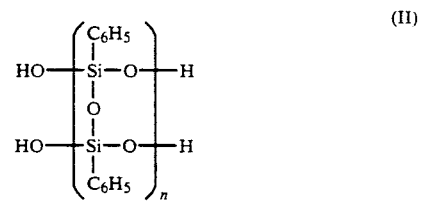

where n is an integer of from 17 to 1,600, said method being characterized by the steps of: dissolving phenyl trichlorosilane in an organic solvent; dripping super-demineralized water into said solvent solution of phenyl trichlorosilane, under cooling, thereby hydrolyzing said compound; then washing the resulting hydrolyzed substance with super-demineralized water; subsequently adding a nucleophilic reagent to said organic solvent phase to subject said hydrolyzed substance to dehydration-condensation reaction under heat; and refining the resulting high molecular weight substance by a dissolution-and-recipitation method.

* * * * *